United States Patent [19]

Azimov

[11] Patent Number: 4,799,511
[45] Date of Patent: Jan. 24, 1989

[54] FLOW SYSTEM OF STATIC PARAMETERS

[76] Inventor: Naum Azimov, 300 Ocean Pkwy., Brooklyn, N.Y. 11218

[21] Appl. No.: 308,034

[22] Filed: Oct. 2, 1981

[51] Int. Cl.$^4$ .......................................... G05D 16/00
[52] U.S. Cl. ............................. 137/613; 137/505.12
[58] Field of Search ................ 137/505.12, 487.5, 613

[56] References Cited

U.S. PATENT DOCUMENTS

| | | | |
|---|---|---|---|
| 1,931,771 | 10/1933 | Pinkerton | 137/487.5 X |
| 1,931,791 | 10/1933 | Dueringer | 137/487.5 X |
| 2,245,210 | 6/1941 | McElwaine | 137/505.12 |
| 2,565,560 | 8/1951 | Jacobsson | 137/512.5 X |
| 2,908,158 | 10/1959 | Jacobsson | 137/505.12 X |
| 3,194,254 | 7/1965 | Zmek | 137/613 X |
| 3,963,043 | 6/1976 | Cota | 137/487.5 |

*Primary Examiner*—Alan Cohan
*Attorney, Agent, or Firm*—Jonathan Schafrann

[57] ABSTRACT

A linear flow system of static or unchanging parameters is provided to dispense a fluid or gas at a constant rate of flow independent of fluctuations in discharge line pressures. The system is composed of at least: a downstream pressure regulating device to maintain an initial constant conduit line pressure P1, a flow regulating device to establish a constant internal and discharge rate of flow by maintaining a constant effective orifice area therethrough, and an upstream pressure regulating device to maintain a second constant conduit line pressure P2. Interposed between the supply source and the downstream pressure regulator responsible for maintaining the initial constant conduit line pressure P1, is an integrally connected series of downstream pressure regulators adapted to synergistically buffer and preserve P1 from fluctuations in supply line pressure. A series of upstream pressure regulators, interposed between the back pressure regulator which maintains the constant conduit line pressure P2 and the discharge line, preserves the constant conduit line pressure P2 from fluctuations in discharge line pressures. A duality of pressure switches integrally connected within the discharge line allows the system to discharge the fluid or gas within a prescribed pressure range. By maintaining a constant descending pressure gradient through the conduit system and a constant effective orifice area through the flow regulating device, a constant discharge rate may be maintained on an ongoing basis.

9 Claims, 2 Drawing Sheets

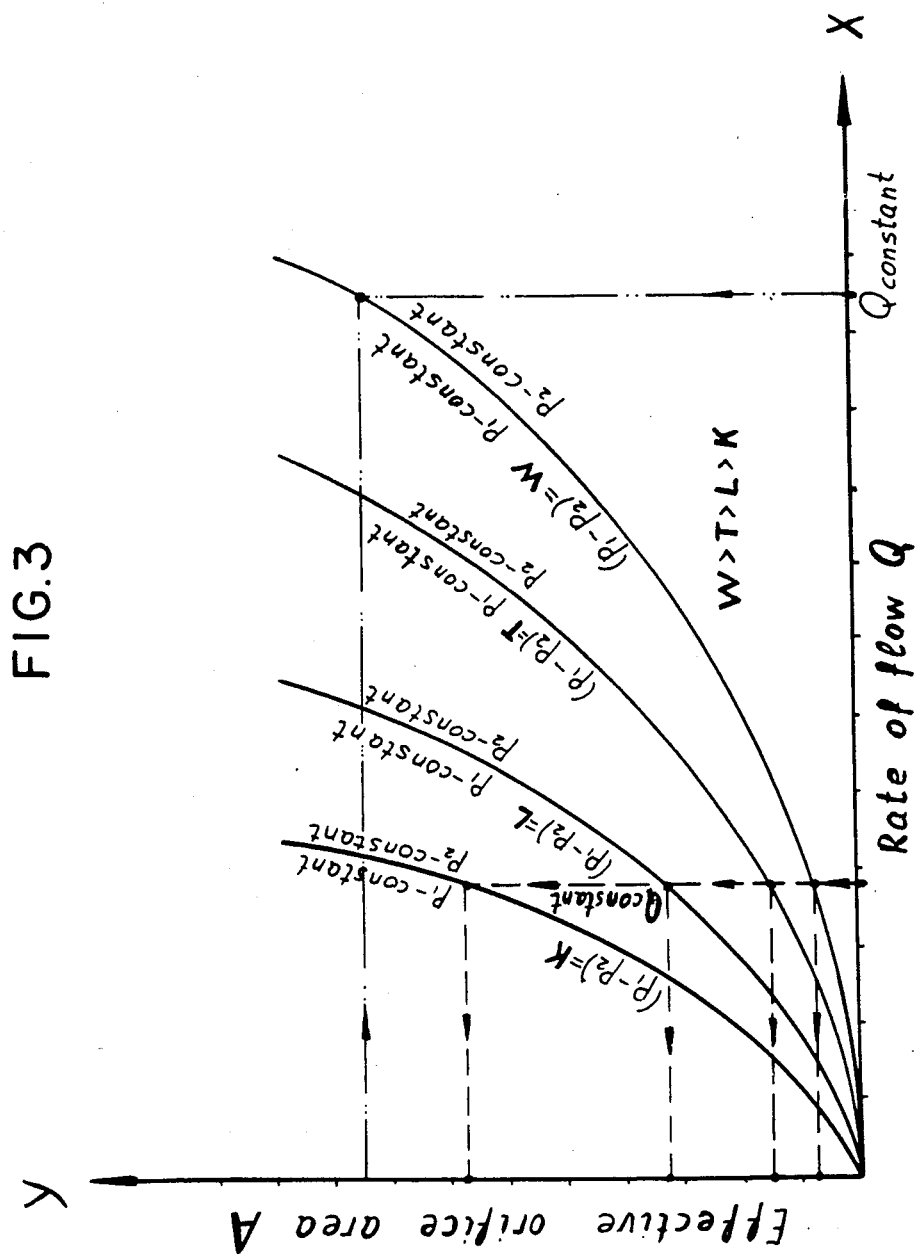

FLOW SYSTEM OF STATIC PARAMETERS

BACKGROUND AND SUMMARY OF THE INVENTION

The present invention relates to a method and to an apparatus for measuring the volumetric rate of flow of a fluid or gas. More specifically, the present invention appertains to an improved method and to an improved system of static parameters and of coordinated components to more accurately measure and maintain a constant discharge rate of flow for material in either a gaseous or a liquid state.

In order to provide for a small home heating system, a large industrial flow system, or any given discharge apparatus with an ongoing supply of a desired amount of a fluid or gas, a flow system must be designed to surmount the following obstacles. The system must accurately and continuously provide precise discharge rates to a consumption point even though the physical characteristics of the material carried therein may change with changes in pressure. The design must also reduce the inherent mechanical error, by eliminating inefficient or superfluous operations. A system which is involved in dispensing often expensive materials over a prolonged period of time magnifies an error, albeit small, into an onerous economic burden. A concomitant problem is to design a flow system that will conserve remaining non-renewable resources. Moreover, the system should be flexible enough to be adapted to any use where it is necessary to transport and accurately dispense a flowing material. For example, the system should be able to supply not only traditional forms of petrochemical energy, but newer energy alternatives such as methanol and liquified petroleum gas as well.

Heretofore, there have been many attempts to provide flow systems to accurately and continuously supply diverse fluids and gases to a point of consumption. As a general rule, available hydraulic and gas flow systems rely on feedback mechanisms which are responsive to internal and external changes in pressure. Some systems rely on by-pass lines to monitor and respond to changes in conduit line pressures caused by changes in discharge line pressures. Other systems are dependent upon such mechanical devices as springs, pistons, and diaphragms, fashioned from a variety of flexible materials, which continually adjust the internal pressures in response to changes in discharge line or supply line pressures. Finally, there are still other systems which employ very sophisticated electronic components, such as sonic nozzles or computers, to compensate for pressure variance by increasing or decreasing the velocity or pressure of the substance flowing through the system.

Notwithstanding the design of the prior art system, the general operative principle at work within the system is related to the ability of the internal parts from which the pressure or flow regulating components of the system are assembled, to compensate for changes in supply line and discharge line pressure. The internal readjustments allow the pressure differential across the component to be kept constant. In purely mechanical prior art systems, the basic operative kinetics are dependent upon keeping the pressure differential, that is, the same proportional difference between the pressure maintained upstream from the pressure regulating device, constant, without regard to internal or discharge rates of flow. The constant pressure differential, which reflects the difference between the inlet and outlet pressures, is maintained by the constant internal readjustment of pressure regulating parts. Thus, the pressure within the system may vary widely, with the outlet pressure rising in response to the rise in the inlet pressure, for as long as the difference in the pressures remains the same, the prior art system will function as anticipated. Generally, a constant pressure differential between the inlet and outlet pressures is obtained by varying the orifice area through the pressure regulating component. This internal adjustment is effected by the internal upward and downward movement of such parts as springs, pistons or diaphragms which open or close the orifice in response to changes in pressure. As a result, the discharge rate of flow is left to be regulated by either an auxiliary system or the discharge apparatus itself.

Mechanical flow systems, as described in the prior art, suffer from an inherent design flaw which is related to the self-adjusting nature of the feedback or compensation mechanism. The constant internal adjustment procedure, to maintain a constant pressure differential, is translated into a dispensing error where either inadequate or excessive amounts of the flowing material are conveyed to the waiting boiler, mixing vat or other receiving apparatus. With only the pressure differential remaining constant, such parameters as conduit line pressures, velocity of the flowing material and the effective orifice area through the components are left to vary, making the discharge accuracies of prior art systems at a given time only as accurate as the ability of the device to respond to changes in exogenously generated pressures. The problem raised hereinabove is purely practical. Such exigent circumstances as the partial occlusion of an oil burner's nozzle which arises periodically due to the introduction of foreign matter into the system, causes an increase in discharge line pressure. In order to overcome this impediment, prior art systems must follow the sequential process outlined below. Firstly, the change in pressure must be perceived by the system. Secondly, the internal part of the affected component must change its position in response to the altered condition. Thirdly, and finally, the system must reach an equilibrium range where the internal workings within the pressure or flow regulating component come to rest at a new adjustment level. As a result of this adjustment process, the system is no longer able to supply the minimum amount of the material necessary for the discharge apparatus to function with the greatest efficiency.

The reason underlying this error is related to the system's need to maintain a constant pressure differential. A constant pressure differential, characterized by constantly changing inlet and outlet pressures, results in a constantly changing discharge pressure. By varying the discharge pressure the force which drives the material into the waiting discharge apparatus is by necessity changed. Thus, greater or lesser amounts of the material are forced through the fixed aperture of the discharge apparatus. Generally, a partially blocked discharge route causes an increase in pressure which leads to the dispensing of excessive or inadequate amounts of the material.

Electronic systems, on the other hand, respond to pressure changes which take place outside the system in the following ways. Some systems electrically activate the internal pressure regulating parts to change internal pressures to keep the pressure differential constant. Other systems increase the rate of flow of the material through the system in response to the changed conditions at the discharge point.

Another problem inherent in systems whose internal parts are in continual motion is material fatigue which prevents individual parts from accurately responding to changes in pressure or altered flow rates. After a finite period, springs, pistons and diaphragms lose their original resiliency and ability to respond to changed operating conditions. This problem is exacerbated where viscous or corrosive materials are to be dispensed.

Prior art systems, whether mechanical or electronic, are inherently expensive to produce due to the sophistication necessary for producing pressure responsive parts. The systems described in the prior art require frequent recalibration to avoid ongoing discharge errors, and the more sophisticated electronic systems respond only to the ministrations of highly skilled repair persons.

Therefore, the principal object of the present invention is to provide a linear flow system of static parameters to accurately and continuously maintain a constant rate of flow of a fluid or a gas to a discharge point despite significant fluctuations in supply line and discharge line pressures. An explanation of the static nature of the present invention follows. The system, composed of a downstream pressure regulating device, a flow regulating device and a back pressure regulating device, connects each device in a linear fashion by conduit. After the system is assembled, each metering and regulating component is adjusted to a set position. This position reflects a predetermined constant pressure and constant flow rate value. The present invention is designed so that constant pressures and flow rates may be maintained within the conduit so that once the constant values are attained the pressure or flow components will not vary the level. Therefore, once the system is adjusted, the internal workings of the pressure and flow regulating components remain unmoving or static.

The flowing material enters the system via a conduit system and a pumping apparatus provides the initial unregulated rate of flow and pressure. An initial constant pressure P1 is obtained by setting a downstream pressure regulating device to the desired conduit pressure level. A flow rate is then set by a metering device to provide a constant rate of flow through the system and to the discharge point. A second conduit line pressure P2 is obtained by an upstream or back pressure regulating device. The back pressure regulator maintains a constant upstream conduit line pressure in the conduit line downstream from the flow regulating device. Finally, a synergistic pressure buffering system, composed of one or more pressure regulating devices, is adapted to protect the constant conduit line pressures. From the above sketch, it is evident that there is no need for a by-pass line to sample internal conditions and to regulate the system; a linear self-maintaining system results.

A concomitant object of the present invention is to provide a system that will withstand dramatic fluctuations in supply line and discharge line pressures.

Still another object of the present invention is to provide a highly accurate system which is capable of easy assembly and which is constructed from the following readily obtainable components of ordinary design: a conduit or tubing system, one or more downstream pressure regulators, a flow metering device, and one or more upstream pressure regulators. The result is an extremely inexpensive yet precise system, the overall accuracy being limited only by the accuracy of the individual components.

A further object of the present invention is to provide a flow system which has virtually no moving parts and few significant maintenance needs. The system at hand may be easily serviced by replacing the inexpensive components, if readjustment is not economically feasible.

Yet another object of the invention is to provide an integral sensing system to monitor and respond to radical changes in conduit line pressure and flow. It is contemplated that a servo-mechanism be adapted to sound an alarm so that readjustment or replacement of a part may be effected, or to deactivate the system and stop the flow of the material completely.

Another object is to provide a linear system which does not rely on a by-pass line to monitor and sample internal pressures and flow conditions.

Another object of the invention is to provide a flow system that will transport a great variety of substances including viscous and corrosive materials.

A further object of the invention is to provide a system that allows the chosen fluid or gas to be dispensed within a prescribed range of pressures.

In accordance with the objects stated hereinabove, the present invention offers a system of static parameters for dispensing precise amounts of fluids or gases at a constant rate of flow. The material, like heating oil, is pumped into the system from a storage facility at a point remote from the system, and enters the system at a base rate of flow and a base pressure Po. One or more pressure regulators modify the downstream pressure of the incoming material, thus protecting the static parameters of the system from significant fluctuations in inlet or supply line pressure. Located downstream from the buffering series of pressure regulators, a pressure regulator of ordinary design modifies the unregulated pressure Po giving rise to a constant conduit line pressure P1. The material flows on through the essentially linear conduit system to a flow regulating device, such as a metering valve, where by dilating or constricting the orifice through the component, a constant rate of flow may be preserved within and without the system. An upstream pressure regulating device or back pressure valve reduces the pressure of the flowing material to a constant value expressed as P2 in the conduit located upstream therefrom. One or more upstream regulating devices buffer and protect the P2 pressure, as the series of pressure regulating devices buffer and protect the P1 pressure, from changes in discharge line pressure. The number of buffering components to be interposed is based on the expectation of pressure changes; the likelihood of significant change increases with the size of the system and with the number of related discharge branches. The material exits at a constant rate of flow and a reduced pressure P3, allowing a discharge apparatus to dispense the material at a constant rate and within a range of pressures P4. A pressure gradient is formed through the system wherein the inlet pressure is not only greater than the outlet pressure, but also is greater than the intervening pressures.

Although most pumping facilities incorporate various kinds of emergency switches or by-pass lines, the present invention is designed to utilize such sensing devices as flow switches to relay unexpected and potentially damaging changes in flow rates and pressures to the servo-mechanism. The servo-mechanism can then shut down the system. This fail-safe feature protects both the individual components and the boiler, mixing vat, or other receiving apparatus which is supplied by the system. In addition, a pair of pressure switches may be integrally connected within the discharge line to allow the system to provide a range of discharge pressures without adversely affecting the upstream conduit pressures which must remain constant.

Other objects, advantages and features of the flow system of static parameters, which is the subject of the present invention, will become apparent when the drawings are taken with reference to the description and to the appended claims.

BRIEF DESCRIPTION OF THE DRAWINGS

FIG. 3 is a graphic representation of the system plotting the relationship of maintaining constant orifice areas and pressures to achieve a constant rate of flow.

DETAILED DESCRIPTION OF THE DRAWINGS

Figure 1:
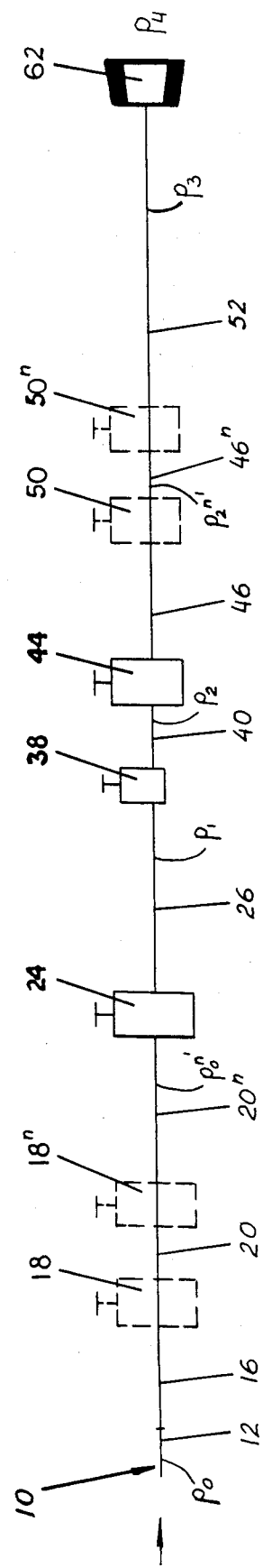
FIG. 1 is a general diagrammatic view of the flow system of static parameters.
Figure 2:
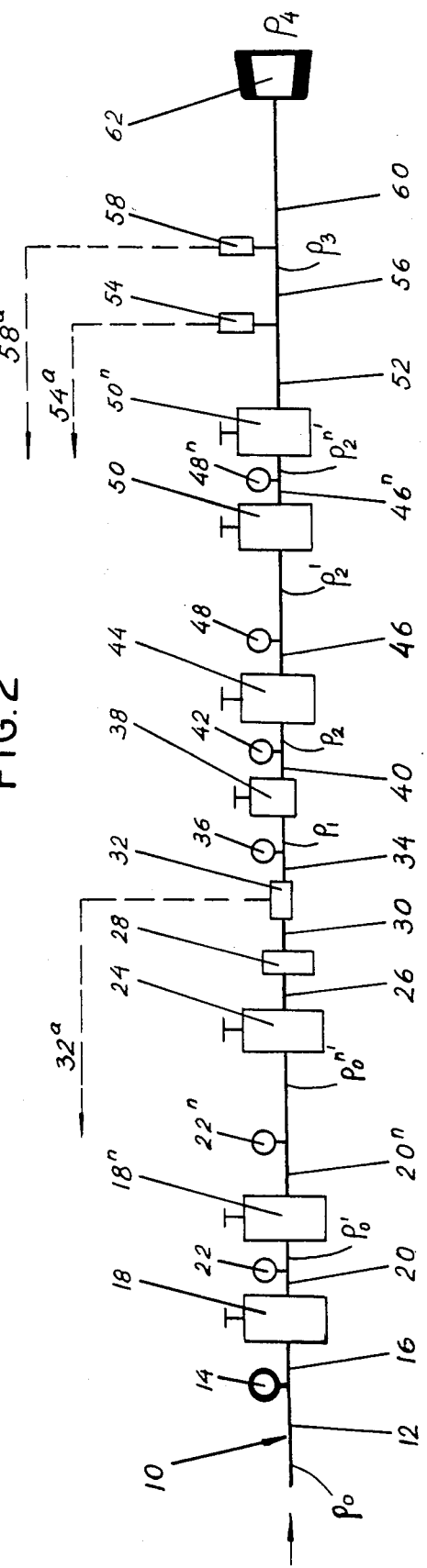
FIG. 2 is a diagrammatic view of the preferred embodiment thereof.

Referring more specifically to the drawings, wherein like numerals refer to like parts throughout, FIG. 1 and 2 show preferred embodiments of the linear flow system of static parameters to be generally referred to by the numeral 10. FIG. 3 offers a graphic representation of the kinetics at work within the system, and details the system's ability for maintaining a constant discharge rate of flow by keeping the parameters of conduit line pressure and effective orifice area constant.

FIG. 1 illustrates the general embodiment of the present invention and shows the minimum number of essential components necessary for effecting the improved method for dispensing fluids and gases outlined below. For purposes of illustration, the method for obtaining a precisely controlled constant discharge rate of flow will be directed to the invention's adaptation to supplying heating oil or natural gas to a furnace or boiler. This adaptation is extremely appropriate for it is essential for furnaces and boilers to receive precisely controlled and unchanging amounts of fuel over prolonged periods of time to achieve economical and efficient operation. By utilizing the flow system of static parameters, which is the subject of the present invention, the user is able to effect the method described hereinbelow to furnish the minimum amount of the desired fuel to maximize the output of the furnace, boiler, or other discharge apparatus.

It should be noted that the components described herein are of ordinary design and are readily obtainable; thus, their specific internal mechanisms are neither part of nor claimed by the present invention. The general stepwise sequence for obtaining the unchanging internal parameters which permits the system to discharge the fluid or gas at a constant discharge rate and within a predetermined pressure range despite fluctuations in discharge line pressure, follows. The heating oil, which is at an optimum temperature, is pumped into the system 10, at a base rate of flow, expressed as a unit measurement in relation to time, and at an unregulated pressure $P_o$, to supply line 12. System 10 is essentially linear, that is, the components are connected in immediate downstream relation to one another by conduit tubing which channels and directs the material. The material, flowing through supply line 12 and its contiguous downstream mate connecting conduit 16, encounters a series of downstream pressure regulating devices as depicted in dotted lines which signify that, although the pressure regulators help maintain the constant pressure within the downstream conduit, they are not essential to the ability of the system to function as anticipated. Pressure regulator 18 to pressure regulator 18$n$ (standing for a number of regulators greater than one), provide a synergistic buffering system to modify the effect of and to prevent the direct interaction of a surge of pressure in the supply line from affecting the constant pressure within the conduit lines. Pressure regulator 18 establishes a reduced downstream pressure of $P_o$ in conduit line 20. As well, pressure regulator 18$n$ maintains a further reduced pressure in conduit 20$n$ of $P_o{}^n$. A constantly declining pressure gradient in the supply line 12 and the connecting conduit 16 results.

Conduit 20 channels the fuel to pressure regulator 24. Pressure regulator 24, one of the three essential components, is responsible for maintaining the constant conduit line pressure $P_1$ in conduit 26 at the desired level. The pressure value in conduit 26 may be infinitely varied, limited only by the fact that the pressure within the conduit must be less than the pressure in the upstream supply line conduit 12, and that once the value is chosen and the setting on the component is fixed so that the internal parts come to rest and remain static the pressure will remain constant.

The heating oil pressurized to the $P_1$ value is admitted into a flow regulating device 38, so that the heretofore unregulated rate of flow may be regulated to best conform to the operating demands and specifications of the discharge apparatus. An optimum flow rate is fixed after the various components of the system have been integrally connected or assembled, by obtaining a measured passageway through the flow regulating device 38, which is expressed as the value A. The value A reflects the effective orifice area through the metering valve or other flow regulating device 38. The unchanging orifice area allows the same amount of fuel to be carried through and to be discharged by system 10.

Conduit 40 transports the flowing material to the third and final essential component, upstream or back pressure regulator 44. Upstream or back pressure regulator 44 establishes and maintain a constant pressure $P_2$ in conduit line 40. Again, any pressure may be maintained in the conduit, limited by the necessity to conform to the relationship that the maximum downstream conduit line pressure be less than the minimum pressure maintained in the conduit line immediately upstream. Thus, the pressure $P_1$ must be greater than the pressure $P_2$, with the unregulated pressure in supply line 12 being greater than any of the intervening downstream pressures, and the discharge pressure $P_4$ being less than any of the upstream conduit line pressures.

The difference between the constant pressure $P_1$ maintained in the conduit above the flow regulating device and the constant pressure $P_2$ maintained in the conduit below the flow regulating device is expressed as the quantity ($P_1-P_2$) or delta-P. The value delta-P reflects both the pressure which is lost as the material travels through the flow regulating device and the force with which the material is propelled through the regulating device. Hence, by increasing the pressure $P_2$, and thereby lessening the delta-P value, one can increase the magnitude of possible discharge pressures. Conversely, by decreasing the P2 pressure value and thereby increasing delta-P, the magnitude of possible discharge pressures is decreased. Therefore, the system can easily reduce the pressure of an incoming flow as supplied by an industrial pumping facility in order to supply a burner or other receiving apparatus with a very low discharge pressure without the necessity of adding further pressure reducing components.

The following advantages of the present invention become manifest. Firstly, by adjusting the flow regulating device, the present system is capable of generating constant flow rates at a wide range of discharge pressures. Secondly, due to the buffering systems, the static system is capable of withstanding great changes in supply line and discharge line pressures; as long as the pressure in the conduit line upstream is greater than the pressure in the conduit line immediately downstream, or more simply, the upstream pressure is greater than the downstream pressure, the system will function as anticipated. Thirdly, once the pressure components are adjusted and set to deliver the desired pressure, the value will be maintained constantly thereon without the requirement of internal adjustment. Finally, with conduit line pressures remaining constant, the system facilitates the transportation of such volatile liquids as liquified petroleum gas which must be kept at a specific pressure to maintain the material in the liquid state.

Composed of three essential components—a downstream pressure regulating device, a flow regulating device, and an upstream pressure regulating device—the system is adjustedly set upon assembly. Once set, the system unfalteringly delivers the same amount of material for as long as the system remains supplied therewith. The ability of the system to provide precise amounts of material at constant discharge rate and pressure range is based on the combination of components employed therein. By utilizing a downstream pressure regulating device which is capable of maintaining a constant conduit line pressure P1 and an upstream pressure regulator which is capable of maintaining a second constant conduit line pressure P2, a constant pressure differential over the flow regulating device delta-P may be kept constant. By keeping the pressure through the flow regulating device constant as well as by keeping the effective orifice area through the flow regulating device constant, the system is able to dispense a constant amount of material. Hence, by taking advantage of the unique combination of components, a material such as heating oil may be pumped into the system at an unregulated pressure and rate of flow wherein the pressure and flow rate are modified to constant levels which comport with the needs of the burner or other discharge apparatus.

A buffering system 50 to 50$n$, as outlined in dotted lines which signify that the system will function as anticipated in their absence, completes the outline of system 10. Just as the pressure regulators 18 to 18$n$ are employed to protectively shield the constant P1 conduit line pressure from changes in supply line pressures, the buffering system composed of back pressure regulators 50 to 50$n$ is adapted to preserve the constant conduit line pressure P2 from changes in discharge line pressures. In essence, buffering systems 18 to 18$n$ and 50 to 50$n$ act as a bulwark to thwart the direct force of the changes in pressure that take place outside of the system to insure that the constant conduit line pressures are maintained.

Referring to FIG. 2, a preferred embodiment of the system 10 is illustrated. The material, in either a liquid or a gaseous state enters supply line 12 at an unregulated pressure Po, and at an unregulated rate of flow, from a pumping apparatus. The unregulated pressure Po is sampled by pressure gauge 14 as the material flows through connecting conduit 16 to a series of downstream pressure regulating and buffering regulators 18 and 18$n$. As a preferred embodiment, the buffering unit is composed of a series of downstream pressure regulators, with 18$n$ standing for any number of regulators greater than one. The downstream pressure regulators 18 and 18$n$ reduce the unregulated pressure Po of the material as it enters the system through supply conduit 12. Hence, pressure regulator 18 maintains a reduced constant pressure in conduit line 20, as sampled and reflected by pressure gauge 22, of Po'. The series of pressure regulators that follow 18$n$ further reduces the pressure of the incoming material so that the pressure in the intervening conduits 20$n$ as sampled by pressure gauges 22$n$. is maintained at reduced values of Po$^{n'}$. The number of downstream pressure regulators 18 and 18$n$ is dependent on the likelihood that a significant fluctuation in the supply source will occur. Thus, for a system connected to a storage facility which services many individual systems, the likelihood for a fluctuation in pressure is significant due to changes in storage tank capacity and pressure, or due to the additive effects of the demands of many flow systems operating coexistently. For such a use, several pressure regulators may be adaptively employed. A series of pressure regulators interposed between the supply line and the pressure regulator responsible for preserving the constant conduit line pressure P1, protects the P1 value in the following ways. Pressure regulators 18 to 18$n$ reduce the often excessive pressure from the pumping apparatus or supply source to a level where pressure regulator 24 need only reduce the pressure a few pounds per square inch to complete the stepwise reduction to obtain the constant conduit line pressure P1. The buffering system is bimodal in scope. Once pressure regulator 24 is adjusted to yield the desired P1 pressure value, the internal parts within the valve come to rest and remain static thereon. The buffering system 18 and 18$n$ absorbs the shocks caused by fluctuations in supply line pressures which prevents these changes from interacting with the internal components of pressure regulator 24. Secondly, the series of pressure regulators regularizes the pressure of the material which enters the system so that the reduction of the pressure to the P1 value is produced with a minimum amount of work for the system.

Flowing through conduit 20$n$, the material reaches downstream pressure regulating device or pressure regulator 24. Pressure regulator 24, as one of the essential components, fixes the first unchanging parameter, pressure P1 in conduit 26. The maximum pressure which can be maintained in conduit 26 must be less than the minimum pressure in the conduit immediately upstream therefrom.

The unregulated rate of the flowing material in conduit 26 is measured by flow meter 28 as the material proceeds through conduit 30 to flow switch 32. Flow meter 28 registers not only the base flow rate of the untuned system, but also the predetermined constant discharge rate during ongoing operation of the fully assembled system.

Flow switch 32 monitors the rate of the moving material in conduit 30, detecting inadequate or excessive flow rates, and responding to these endogenous changes by signalling the servo-mechanism through the leads contained in line 32a. In addition, flow switch 32 responsively reacts to the effects of changes which take place outside of the system 10. For example, a radical upward change in the P4 or discharge pressure which results in the discharge pressure exceeding the constant conduit line pressure P2 not only violates the established pressure gradient, but also changes the rate of flow by changing the pressure driving the material through the system. The system 10 maintains a constant rate of flow by preserving the pressure (P1-P2) or delta-P with which the flowing material passes through the effective orifice area of flow regulating device 38. The pressure value which drives the fluid or gas through flow regulating device 38 is derived by subtracting the constant pressure P1 maintained in the conduit above flow regulating device 38 from the constant pressure P2 maintained in the conduit below flow regulating device 38. For convenience, the quantity P1 minus P2 may be referred to as delta-P. A change in the delta-P value changes the pressure with which the material moves through the flow metering device, and this increase or decrease of pressure forces either more or less material through the unchanging orifice within the flow regulating device. Changing the rate of flow within the system, in turn, triggers the flow switch to intercede, thereby stopping the continued functioning of the system through the intervention of the servo-mechanism. The kind of servo-mechanism to be employed, as a further protective measure to shield system 10 from changes that the emergency devices outside the system fail to respond to, is immaterial to the present invention, making specific components thereof neither part of nor claimed by the present invention.

It should be noted that many of the individual components may be replaced, as alternate embodiments of the same invention, by other components or combination of components. For example, the present system mandates the use of a flow meter and a flow switch, although a more complex individual component may be adaptively substituted, replacing both, without changing the character or the function of the system.

Conduit 34 guides the coursing material to a flow regulating device or metering valve 38, the flow being sampled by pressure gauge 36. The flow regulating device or metering valve 38 gives rise to the second unchanging parameter. The area of the passageway through the metering valve is kept constant, allowing only a prescribed amount of the material to traverse the orifice opening. This unchanging effective orifice area is expressed as a value A, and reflects the unchanging orifice opening which permits the desired amount of the material to be constantly discharged through the system. The A setting regulates the internal flow rate and so is responsible for the constant discharge rate of flow. Accuracies provided by available metering valves allow the user to achieve extremely precise discharge flow rates that far exceed accuracies obtained by conventional compensating systems which rely on external flow rate control.

Passing through conduit 40, at a constantly regulated rate of flow as determined by the orifice area A, the material undergoes a final modification to complete the triad of fixed parameters. An upstream or back pressure regulating device 44 is employed to fix and preserve the constant pressure P2 in conduit 40 as registered by pressure gauge 42. Pressure P2, which is less than the constant pressure P1 maintained in conduit 26, is adjustedly fixed after the system 10 has been fully assembled.

Although a single upstream or back pressure regulator 44 allows the system 10 to function as intended, the preferred embodiment mandates that a series of back pressure regulating devices be integrally interposed within the discharge conduit line 46, to synergistically buffer and protect the constant P2 pressure maintained in conduit 40 from fluctuations in discharge line pressures. It is essential that P1 and P2 be maintained at a constant level continuously so that the value (P1-P2) or delta-P, which drives the fluid or gas through the fixed orifice area A of flow regulator 38, will remain constant. Thus, the fluid or gas traveling at a constant rate of flow Q (gallons per minute or standard cubic feet per hour), as controlled by flow regulating device 38 and at a constant conduit line pressure P2 as controlled by back pressure regulator 44, enters conduit 46.

Back pressure regulator 50 controls the upstream pressure of the material in conduit line 46 giving rise to a value expressed as P2'. Pressure gauge 48 registers this constant conduit line pressure. The pressure P2' represents a critical value, for if the pressure P2' in conduit line 46 at any time exceeds the pressure P2 maintained in conduit line 40, the P2 value will rise in an attempt to preserve the descending pressure gradient. The upward shift in P2 will in turn cause a change in the value of (P1-P2) or delta-P. As stated earlier, a change in delta-P will cause a consequent change in the internal and discharge flow rates, thereby activating flow switch 32 to signal the servo-mechanism to deactivate the system.

The material passes through a series of discharge conduits 44n wherein the back pressure regulating devices 50n further reduce the pressure to a value of P2'n, as sampled by pressure gauges 48n. The number of back pressure regulating valves to be employed as the preferred embodiment of the present invention is based on the same reasoned expectation as that used for the interposition of buffering valves 18 to 18n within the supply line. A greater expected potential for an abrupt change in discharge line pressure necessitates that a greater number of back pressure valves be utilized to intercept the force of the change. Thus, for a home heating system, a single additional back pressure regulator may be sufficient to handle a small change in discharge pressure, while in an industrial installation a series of regulators would be required.

The buffering system, composed of a series of back pressure regulators 50 to 50n, function in the following way. An unexpected surge of pressure in the discharge line 60, induced by a clog or other narrowing of the discharge apparatus, first challenges the emergency mechanisms within and without of flow system 10. If the surge of pressure is not great enough to trigger the emergency systems, then buffering system 50 to 50n absorbs the force of the change. By maintaining the descending stepwise pressure gradient within buffering system 50 to 50n, changes in discharge line pressures have the potential for changing only the pressure within the buffering system thereby preserving the constant pressure P2. Since the system is designed to maintain a constant discharge rate of flow when the pressures within the conduit line are held constant, it is imperative that exogenous changes in pressure are prevented from directly affecting the conduit lines wherein the constant pressures P1 and P2 are maintained. Therefore, if the pressure rise generated by conditions in the discharge line exceeds the minimum pressure in the conduit immediately upstream, the passageway through the back pressure valve opens, so that its effective working area is the same as the working area of the connecting conduit. At this point, the valve no longer functions as a regulating device, but merely acts as a continuation of the conduit tubing, offering no resistance and channeling the flow to the discharge point. The same procedure takes place when the pressure generated in the discharge line also exceeds the pressure regulated by the back pressure regulator which is in immediate downstream relation thereto. The back pressure regulator opens and the widened orifice dilates to become merely a connection within the conduit to which it is integrally attached. The process repeats itself for as long as the downstream pressure is greater than the upstream pressure. Although unlikely, if the emergency system or servo-mechanism fails to deactivate the system, and the pressure P2', or the pressure in conduit 46 immediately downstream from back pressure regulator 44, equals or exceeds the constant conduit line pressure P2 as maintained in conduit 40, the rate of flow will be altered which in turn alerts flow switch 32 to intervene and deactivate the system 10. After this momentary shutdown, the system 10 need only be cleaned or have a component recalibrated or replaced for the system to return to its normal function and for the constant discharge rate to be maintained.

The advantages inherent in using a series of upstream pressure regulators, as adaptively utilized in buffering system 50 to 50n, is that although fluctuations in discharge line pressure and internal pressure may effect a change of pressure within the buffering system 50 to 50n, the change in pressure will not directly interact with, and change the P2 value, since it is the P2 value which insures that the force of the pressure (P1-P2) which drives the material through the constant orifice opening remains constant. For it is when P1 and P2 are constant that a constant rate of flow may be obtained. Unlike the present system, previously available flow systems were sensitive to the vagaries of changes in the discharge pressure because of the overall principle which guides their operation; constant internal adjustment is necessary to maintain a constant pressure differential. Hence, the pressure, however slight, directly affects and interacts with the internal adjustment components (springs, diaphragms or pistons), inducing a small change in the discharge pressure which, in turn, prevents the same amount of fluid or gas to be discharged through the discharge apparatus. Unlike older systems which must continually readjust their internal parts in response to changes in pressure, the present system may passively accept the changed discharge line pressure within the buffering system as long as the pressure P2' in the discharge line does not equal or exceed the constant pressure P2 maintained in conduit line 40. This passive acceptance of changes which take place in the discharge line enables the system to withstand wide fluctuations in discharge line pressures while preserving a constant rate of flow to the discharge apparatus 62. Buffering system 50 to 50n insures the maintenance of a constant rate of flow by absorbing pressure changes induced within the discharge line or within the functioning discharge apparatus, keeping the pressure P2 constant, thereby allowing the delta-P or (P1-P2) value to remain unchanged to drive the same amount of material through system 10.

From the series of back pressure regulators 50 to 50n, the flowing material enters discharge conduit 52 at a reduced pressure P3, where it is monitored by a second sensing mechanism which is designed to respond to changes in discharge line pressures. As a preferred embodiment, the second monitoring means is composed of a duality of pressure switches 54 and 58 which are integrally connected to the system by conduit 56. Pressure switches 54 and 58 adaptively define an uppermost and, when necessary, a lowermost pressure limit within which the material may be discharged from system 10 to discharge apparatus 62. Thus, pressure switch 54 may be set to respond to a maximum pressure in conduit 52 which is less than the pressure P2' maintained in the conduit 46. A sudden rise in pressure in discharge line 60 would be perceived by pressure switch 54, thereby communicating the rise to the servo-mechanism via leads housed within line 54a, and summoning the servo-mechanism to intercede.

Flow switch 58 monitors the pressure in the discharge line 60 and reacts to precipitous drops in discharge line pressures. Although a sudden drop in pressure in the discharge line will not disturb the pressure gradient and will not cause a change in the (P1-P2) or delta-P value, it is imperative for some dispensing applications that a minimum amount of pressure be maintained in the discharge line. For example, when the system is used to deliver a material which is to be dispensed as a fine mist or spray, it is necessary that a minimum amount of pressure be maintained so that the discharge nozzle can passively create the ongoing condition therethrough. Therefore, a sudden fall in the discharge pressure, which would prevent efficient discharge operations from continuing, would be perceived by pressure switch 58 and a signal via the leads housed in line 58a would again signal the servo-mechanism to intercede.

The material, flowing at a constant rate of flow as regulated by flow regulating device 38, and within a prescribed range as monitored by pressure switches 54 and 58, exits from the system through discharge line 60 at a pressure P3. From discharge line 60, the material is introduced to the discharge apparatus 62 where it is dispensed at a constant rate of flow within a range of pressures P4. Once the adjusted flow has been initiated, the system, composed of static parameters P1, P2, and A, will discharge the material at a constant rate of flow indefinitely, barring untoward circumstances.

A graphic representation of the static flow system is presented in FIG. 3 which plots the relationship between the constant variables P1 and P2 or (P1-P2=delta-P) and the effective area through the orifice or A, and a constant discharge rate of flow Q expressed as gallons per minute for a fluid (GPM) or as standard cubic feet per hour for a gas (SCFH). The general mathematical postulate presented graphically shows that a constant discharge rate of flow may be sustained by keeping the pressure (P1-P2) or delta-P within the system constant, and by keeping the effective orifice area A through the metering valve constant.

Referring now to the graph of FIG. 3, the delineations on the X-axis represent the desired constant discharge rate of flow. On the Y-axis, the lineations define constant effective orifice areas through the flow regulating device or the metering valve, which is as stated above expressed as a value A. To understand the operative kinetics of the system, a person would employ the graph in the following manner. Firstly, the desired constant flow or discharge rate on the X-axis would be chosen, the volumetric rate conforming to the specified needs of the discharge apparatus. The second step is to move upward from the X-axis until the line intersects with the constant pressure value (P1–P2=delta-P). The constant pressure value allows the user to choose a constant pressure P2 which best comports with the further reduction which is necessary to maintain the pressure gradient and supply a discharge apparatus. By moving to the left and over to the Y-axis, from the point where the constant discharge rate of flow, expressed as the quantity GPM, intersects with the static pressure value expressed as (P1–P2=delta-P), the effective orifice area through the metering valve or other flow regulating device expressed as the value A may be ascertained. Hence, the values of pressure and orifice area may be modified as the discharge apparatus requires. Conversely, by choosing an unchanging effective orifice area through the metering valve, and a desired constant rate of flow, the pressure necessary to generate this desired rate is found by moving up from the X-axis which reflects the desired constant rate of flow, and over from the Y-axis which reflects the unchanging orifice area, to a point of intersection on one of the constant pressure variable lines.

By modifying the settings on the pressure or flow components, an infinite number of constant discharge rates of flow at a given pressure may be obtained, limited only by the constraints of practicality. FIG. 3 also illustrates the basic concept that a system of unchanging parameters may be employed to provide a constant discharge rate of flow to a given discharge apparatus. It is evident that the system allows the user flexibility never before allowed by previous flow systems so that discharge pressures and rates of flow may be best adapted to the specific discharge need.

As the graph suggests, in order to achieve a constant discharge rate of flow, one need merely adjust the pressure regulating devices which are responsible for maintaining the constant conduit line pressures P1 and P2 and adjust the effective orifice area through the flow regulating device, to preserve the desired constant flow rate. Hence, by changing the pressure variables, one can create a system capable of producing extremely high and low discharge pressures without the necessity of adding sophisticated auxiliary parts.

The graphic representation of the system as illustrated in FIG. 3 may be distilled into a mathematical formula which shows how the fixed parameters of the static system cooperate and provide a constant discharge rate of flow. Therefore, for a material in a liquid or gaseous state, the following variables are to be employed as follows:

P1=inlet pressure
P2=outlet pressure
delta-P=the difference between P1 and P2 (where P1 is greater than P2)
A=the effective orifice area
Q=a constant rate of flow for either the fluid or gas
D=the density of the fluid or gas
C=flow coefficient through the flow regulating device
E=expansibility factor of the gas Therefore, in order to obtain a constant discharge rate of flow, one would use the following formulae to fix the unchanging parameters within the system.
For a fluid:

$$Q = CA\sqrt{\frac{(2)(P1 - P2)}{D}}$$

For a gas:

$$Q = CAE\sqrt{\frac{(2)(P1 - P2)}{D}}$$

The mathematical equations set out above suggest that a fixed relationship exists among the internal parameters of pressure, the effective area through the orifice and rate of flow. This relationship allows the user to modify either value to best comport with the discharge needs of the discharge apparatus.

Although the description presented hereinabove suggests the use of certain components to achieve the constant parameters of pressure P1, P2, and the orifice area A, the use thereof is for illustration purposes only, for it will be readily understood by those skilled in the art that other modifications and variations may be made without departing from the spirit of or from the scope of the appended claims.

Therefore, I claim:
1. A flow system of static parameters comprising:
   a. a supply means for introducing a fluid or gas at an unregulated rate of flow and an unregulated pressure Po into said system;
   b. a conduit means for channeling the flow of said fluid or gas through said system;
   c. a downstream pressure regulating means to establish and maintain a constant initial conduit line pressure P1 continuously;
   d. a plurality of downstream pressure regulating means located in upstream relation to said downstream pressure regulator which maintains said initial constant pressure P1, to buffer and preserve said initial constant pressure P1 from fluctuations in said pressure Po;
   e. a plurality of sensing means integrally connected to said conduit means and operatively responsive to changes in flow rates and pressures generated therein;
   f. a means to regulate the flow of said fluid or gas;
   g. an upstream pressure regulating means to establish and continuously maintain a second constant conduit pressure P2 located in downstream relation to said flow regulating means;
   h. a plurality of upstream pressure regulating means located in downstream relation to said upstream pressure regulator which maintains said second constant conduit line pressure P2 to buffer and preserve said second pressure from fluctuations in discharge line pressures; and
   i. a discharge means capable of dispensing said fluid or gas.

2. A downstream pressure regulating means as described in claim 1 further comprising a pressure regulating valve.

3. A plurality of downstream pressure regulating means as described in claim 1 further comprising a plurality of pressure regulating valves.

4. A means to regulate the flow of fluids or gases as described in claim 1 further comprising a metering valve.

5. An upstream pressure regulating means as described in claim 1 further comprising a back pressure regulating valve.

6. A plurality of upstream pressure regulating means as described in claim 2 further comprising a plurality of back pressure valves.

7. A method which utilizes a flow system of static parameters for measuring and regulating the flow of fluids and gases which comprises:
   a. introducing said fluid or gas from a storage site under an unregulated pressure and rate of flow into a conduit means;
   b. establishing constant initial downstream pressure P1 in said conduit line and maintaining said constant pressure continuously wherein said initial constant conduit line pressure P1 is less than said unregulated pressure from a supply line;
   c. establishing an unchanging volumetric flow of said fluid or as through said conduit means;
   d. estabishing a constant second pressure P2 in said conduit in downstream relation to said initial constant conduit line pressure P1 wherein said second constant conduit line pressure P2 is less than the initial constant conduit line pressure;
   e. monitoring the rate of flow and pressure of said material in said conduit line; and
   f. dispensing said fluid or gas through a discharge means at a constant rate of flow independent of fluctuations in pressures in said discharge means wherein said pressure in said discharge means is less than said constant second pressure P2.

8. A method as described in claim 7 for preserving the initial downstream constant conduit line pressure P1 from fluctuations in pressure in a supply line by interposing a plurality of downstream pressure regulating devices between said supply line and a downstream pressure regulating valve which operatively maintains said initial downstream constant conduit line pressure P1.

9. A method according to claim 7 for achieving a constant discharge rate of flow which comprises:
   a. maintaining a descending stepwise pressure gradient wherein the upstream constant conduit line pressure P1 is greater than the downstream constant conduit line pressure P2; and
   b. interposing a plurality of pressure switches to maintain a maximum and minimum upstream constant conduit line pressure P1 and downstream constant conduit line pressure P2, said switches to be in operative communication with a servo-mechanism.

* * * * *